Oct. 9, 1956
R. J. HAUG
2,765,666
KNEE JOINT FOR PORTABLE TOOLS
Filed Jan. 4, 1954
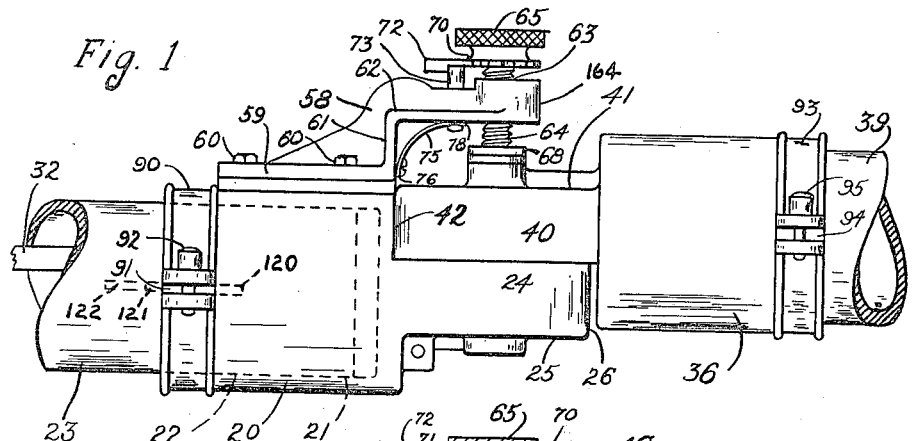
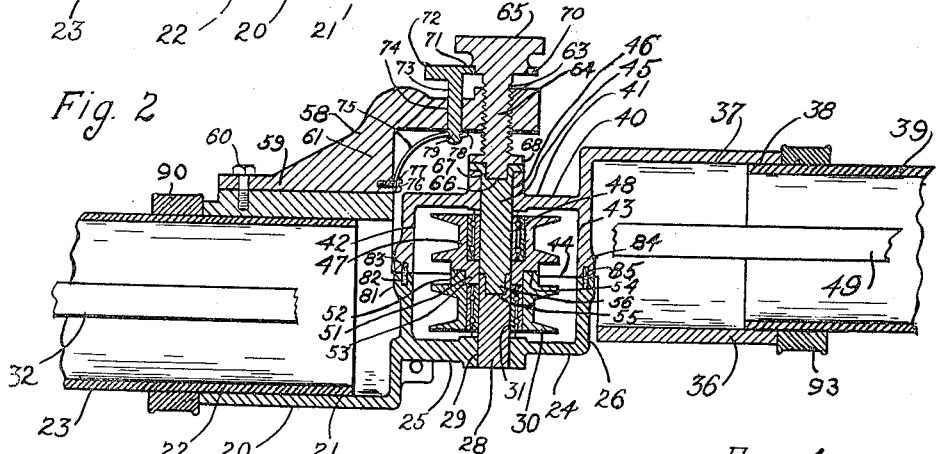
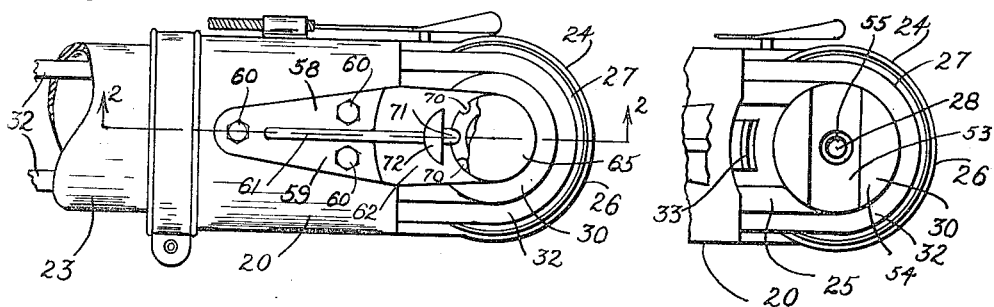
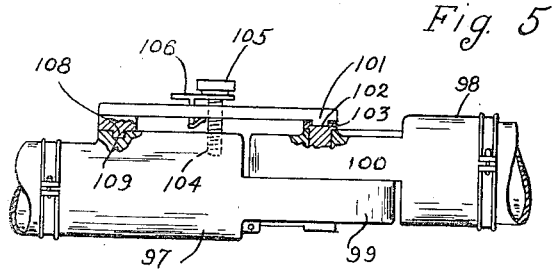
INVENTOR.
Richard J. Haug
BY
Pearson + Pearson
Attorneys

United States Patent Office 2,765,666
Patented Oct. 9, 1956

2,765,666

KNEE JOINT FOR PORTABLE TOOLS

Richard J. Haug, Nashua, N. H.

Application January 4, 1954, Serial No. 401,808

8 Claims. (Cl. 74—228)

This invention relates to portable engine operated tools of the type in which a tubular handle of rigid material contains belts and pulleys for transmitting power to the tool. It especially relates to an improved knee joint construction in a tubular handle such as shown in my copending application Serial No. 237,462, filed July 18, 1951, entitled, Portable Power Operated Tool, now Patent No. 2,725,753.

The principal object of this invention is to provide a separable knee joint between sections of a tubular handle which can be easily connected and disconnected and has no parts which can become lost.

Another object of the invention is to provide threaded means for tightening the separable knee joint whereby wear on the meeting surfaces can be taken up to prevent vibration and looseness.

A further object of the invention is the provision of a rigid arm on one knee joint head of the handle, which arm forms a bifurcation, or fork, with the pulley socket of the same knee joint head for receiving and controlling the pivoting of the pulley socket of the opposite knee joint head.

Still another object of the invention is to provide adjustable sleeves on the sections of the tubular handle to position such sections in the axial bores of the knee joint heads while permitting rotation around the longitudinal axis of the handle.

A further object of the invention is to provide tongue and slot means on the meeting faces of the pulleys in each knee joint head to cause the pulleys to engage each other and revolve as a unit when the joint is assembled.

In the drawing,

Fig. 1 is a side view of the knee joint in assembled position.

Fig. 2 is a view similar to Fig. 1 but in section on line 2—2 of Fig. 3.

Fig. 3 is a plan view of the knee joint head which carries the rigid arm and threaded jaw element of the invention with a portion of the knob broken away to show the locking means thereof.

Fig. 4 is a fragmentary view similar to Fig. 3 but with the rigid arm broken away to show the diametrical slot in the pulley.

Fig. 5 is a view similar to Figs. 1 and 2 of a modification of the invention.

As shown in Figs. 1-4 the separable knee joint of the invention includes a knee joint head 20 axially bored at 21 to receive the terminal end 22 of a tubular section 23 of a tubular, power transmitting handle made of rigid material such as aluminum. An integral pulley socket 24 is formed at the other end of head 20, the socket 24 having a bottom wall 25, a curved side wall 26 and an opening 27 in the top portion thereof. A stub shaft 28 is fixed in a cylindrical opening 29 in bottom wall 25 and a pulley 30 is journalled on shaft 28 by means of bearings 31. Pulley 30 is thus journalled in socket 24 to rotate on an axis of rotation perpendicular to the axis of axial bore 21 and of tubular handle section 23. A flexible belt 32, for transmitting power along the interior of section 23 to a tool, or from an engine, is trained around pulley 30 and passes on opposite sides of a stud 33, the stud 33 (see Fig. 4) forming a continuation of curved side wall 26. A similar knee joint head 36 is included in the separable knee joint of the invention and includes an axial bore 37 for the terminal end 38 of a tubular handle section 39 as well as an integral pulley socket 40. Socket 40 is provided with a bottom wall 41, a curved side wall 42, a stud 43 similar to stud 33, and an opening 44 at the top. A stub shaft 45 is fixed in an opening 46 in bottom wall 41 and a pulley 47 is journalled on shaft 45 by means of bearings 48 to rotate on an axis perpendicular to the axis of axial bore 37. A flexible belt 49 is trained around pulley 47 and leads to a similar pulley, not shown, at the other end of handle section 39.

As thus far described, the knee joint of this invention is somewhat similar to the knee joint shown and described in my above mentioned Patent No. 2,725,753. However, the pulley interengaging means of said copending application included pins in the face of one pulley and corresponding pin holes in the face of the other pulley.

In this invention, I avoid the possibility of vibration, chattering and breakage by providing pulley interengaging means in the form of an integral tongue 51 in the meeting face 52 of one of the pulleys such as 47. Tongue 51 extends entirely across the central portion of the face 52 and is of a width about equal to one-third the diameter of the pulley 47. An integral tongue groove, or slot, 53, corresponding in shape and size to tongue 51, extends entirely across the central portion of the face 54 of the other pulley such as 30. It will be apparent that when the disconnected knee joint heads 20 and 36 are brought together for joining, with pulley sockets 40 and 24 overlying each other, tongue 51 will enter tongue groove 53 and cause the pulleys 30 and 47 to rotate as a unit. In addition a cylindrical recess 55 is provided in the inner end of the shaft 28 to receive an integral cylindrical extension 56 on the corresponding end of shaft 45 thereby positively centering the pulleys and assuring their rotation about a common axis of rotation.

Instead of a threaded bolt, forming a removable pivot pin, for connecting and disconnecting the pair of heads of the separable knee joint as shown in the aforesaid Patent No. 2,725,753, I provide permanently attached clamping means in this invention. There is thus no danger of losing the pivot pin, no wrench is required to assemble the parts, and an additional rigid member is provided on one knee joint head for supporting the other knee joint head of the pair.

It should be noted that the clamping means of the invention uses a socket such as 24 as a stationary jaw of the clamping means which jaw cooperates with a movable jaw mounted entirely on the outside of the same knee joint head to clamp the socket of the other head therebetween.

A rigid arm 58, having a base 59 firmly attached to a knee joint head such as 20 by bolts 60, extends upwardly at 61 and then forwardly at 62 in a direction parallel to but spaced from the pulley socket 24 of the head. Directly above and in projection of the axis of rotation of pulley 30, a threaded opening 63 is formed proximate the free terminal end 164 of arm 58. A movable jaw member, preferably in the form of a thrust screw 64, threadedly engaged in opening 63, is arranged to advance and retract along the projected axis of rotation of pulleys 30 and 47 when its knob 65 is manually turned. The terminal tip 66 of thrust screw 64 preferably enters a corresponding axial recess 67 in the pulley socket 40, or in the base of the stub shaft 45, for centering and retaining the tip as a pivot. A flange 68 may also be provided around the tip 66 to seat the same around the opening of the axial recess 67.

Latching means for the thrust screw 64 is provided to fix the screw in position when the knee joint heads have been brought together and the screw tip 66 tightened into position in axial recess 67. A series of notches such as 70 are located around the lower portion of knob 65 and a latching pin 71 is arranged to enter the notch opposite its location. Pin 71 has a finger grip portion 72 and a rod portion 73, the latter being slidably mounted in a hole 74 in the rigid arm 58. A leaf spring 75 has one end 76 fixed to arm 58 by a screw 77 and its opposite end 78 is connected at 79 to the lower end of rod 73. Thus the latching pin 71 may be pressed downwardly against the pressure of spring 75 to disengage from a notch 70, the knob 65 may then be turned the desired amount and the finger grip 72 then released to cause pin 71 to again engage a notch 70 and lock the screw 64 in place.

As best shown in Fig. 2, anti-friction means is provided to permit the overlying pulley sockets 24 and 40 to flex without undue wear of their meeting edges. Opening 27 of socket 24 is provided with an enlarged peripheral edge 81, having a groove 82 therearound which groove is also continued in the stud 33. An insert 83 of a different metal than that of the knee joint heads is fixed in the groove 82 to form an upstanding flange. The opening 44 of socket 40 is also provided with an enlarged peripheral edge 84 having a groove 85, similar to groove 82, which fits over and rides on the insert 83 when the sockets 24 and 40 are brought together. Insert 83 thus provides contact of different metals between the sockets, prevents dust and dirt from entering the knee joint and lends support against breakage to the joint.

The tubular handle section 23 is provided with a sleeve 90, split at 91 and tightenable around the exterior thereof by a set screw 92. Handle section 36 is provided with a similar sleeve 93, split at 94 and tightenable with a set screw 95. Preferably the handle sections 23 and 36 slidably and rotatably fit within their respective axial bores 21 or 37 and are prevented from removal therefrom by the belts 32 or 49. Each sleeve 90 or 93 may thus be tightened in position to make the belts taut and at the same time permit rotation of the handle sections around the longitudinal axes of the axial bores of the knee joint heads.

In Fig. 5 a modification is shown in which a pair of knee joint heads 97 and 98, each having a pulley socket 99 or 100 are connected by a rigid member 101. Rigid member 101 includes a pivot element 102, similar to the terminal tip 66 of screw 64 and pulley socket 100 includes an axial recess 103 shaped to receive the element 102. Threaded means for advancing and retracting the element 102 along the projected axis of rotation of the pulleys in sockets 99 and 100 includes a threaded post 104 fixed in knee joint head 97 and a threaded knob 105 turnable thereon. Latching means 106, similar to latch 70 is provided to prevent knob 105 from unthreading. A stud 108, fitting a recess 109 is also provided whereby upon unthreading of knob 105, the rigid element 101 may be pivoted sidewise on post 104 if desired. Other changes may be made in the construction of the invention without departing from the spirit thereof, for example the rigid member 101 could be hinged to knee joint head 97 but the structure shown in Figs. 1–4 is preferred as more practical and inexpensive to manufacture.

As shown in dotted lines in Fig. 1, I may provide a stop member 120 on sleeve 90 to contact base 59, or some other suitable projection on head 20, to prevent undue twisting of belt 32. Member 120 is carried on set screw 92 and includes a lug 121 slideable in a slot 122 in section 23 for angularly positioning and slideably guiding member 120.

I claim:

1. A separable knee joint for a tubular handle of rigid material, of the type containing belt and pulley power transmitting mechanism, said knee joint comprising a pair of knee joint heads, each axially bored to slidably receive a section of a tubular handle and each having an integral pulley socket with a pulley journalled therewithin independent of connection to the other head to rotate on an axis of rotation perpendicular to the axis of said bore; axially slidable interengaging means on the meeting face of each pulley for causing said pulleys to rotate as a unit when the pulley sockets are positioned to overlie each other, and clamping means mounted on the exterior of one of said knee joint heads, including a jaw member movable along the projected axis of rotation of the pulley in the socket on said head and cooperable with the pulley socket on said head for receiving and clamping the pulley socket of the other head therebetween.

2. A combination as specified in claim 1 wherein said interengaging means comprises an integral tongue extending entirely across a central portion of the meeting face of one of said pulleys and a correspondingly shaped integral tongue groove, for slidably fitting said tongue, extending entirely across a central portion of the meeting face of the other said pulley.

3. A combination as specified in claim 1 wherein the pulley socket of the knee joint head received in said clamping means includes an axial recess for receiving a portion of said jaw member.

4. A combination as specified in claim 1 wherein said clamping means includes a pair of threadedly engaged elements, one fixed to said head and the other mounted to advance and retract a jaw member along the projected axis of rotation of the pulley in the knee joint head which carries said clamping means.

5. A combination as specified in claim 1 wherein said clamping means includes a rigid arm fixed to the exterior of a knee joint head and extending parallel to the pulley socket in said head but at a spaced distance therefrom, said jaw member comprises a thrust screw, threadedly engaged in the free terminal end of said arm with its longitudinal axis coinciding with the axis of rotation of the pulley in said head and the pulley socket of the other head includes an axial recess for receiving the terminal tip of said thrust screw.

6. A combination as specified in claim 1 plus latching means on said clamping means for locking said jaw member against movement along said projected axis of rotation.

7. A combination as specified in claim 1 plus a pair of split sleeves, each adapted to encircle a section of a tubular handle at the entrance of the axial bore of one of said knee joint heads and each having a set screw for contracting the sleeve to axially position a handle section in said axial bore.

8. A separable knee joint for a tubular handle of rigid material of the type containing belt and pulley power transmitting mechanism, said knee joint comprising a pair of knee joint heads, each axially bored to slidably receive a section of a tubular handle and each having an integral pulley socket with a pulley journalled therewithin to rotate on an axis of rotation perpendicular to the axis of said bore; interengaging means on said pulleys for causing the same to rotate as a unit when overlying each other; a rigid member mounted on one of said knee joint heads and extending parallel to the pulley socket on said head; a pivot element at the terminus of said rigid member; threaded means associated with said rigid member for moving said pivot element along the projected axis of rotation of the pulley socket on said head; an axial recess in the pulley socket of the other knee joint head for receiving said pivot element and a spring pressed latching element on said rigid member for locking said threaded means against unthreading.

References Cited in the file of this patent

UNITED STATES PATENTS

| 136,577 | Worswick et al. | Mar. 4, 1873 |
| 1,500,579 | Eager | July 8, 1924 |
| 1,934,960 | Woodruff | Nov. 14, 1933 |
| 2,528,116 | Clemson | Oct. 31, 1950 |

FOREIGN PATENTS

| 14,032 | Great Britain | 1914 |